Nov. 6, 1934.    J. W. B. PEARCE    1,979,768
DOUBLE UNIVERSAL JOINT
Filed July 24, 1933

INVENTOR
JOHN W. B. PEARCE
Kwis Hudson & Kent
ATTORNEYS

Patented Nov. 6, 1934

1,979,768

UNITED STATES PATENT OFFICE 1,979,768

DOUBLE UNIVERSAL JOINT

John W. B. Pearce, Toledo, Ohio

Application July 24, 1933, Serial No. 681,927

13 Claims. (Cl. 64—102)

This invention relates to universal joint structures and, more particularly, to an improved form of double universal joint which is of economical construction and which is durable and efficient in operation.

An object of the present invention is to provide an improved universal joint structure comprising a plurality of universal joint assemblies and embodying novel means for centering or relatively positioning corresponding members of the joint assemblies.

Another object of this invention is to provide an improved double universal joint wherein novel means is provided for sealing and lubricating the positioning connection for the joint assemblies.

Other objects and advantages of this invention will be apparent from the following description when taken in conjunction with the accompanying sheet of drawings, wherein.

Figure 1:
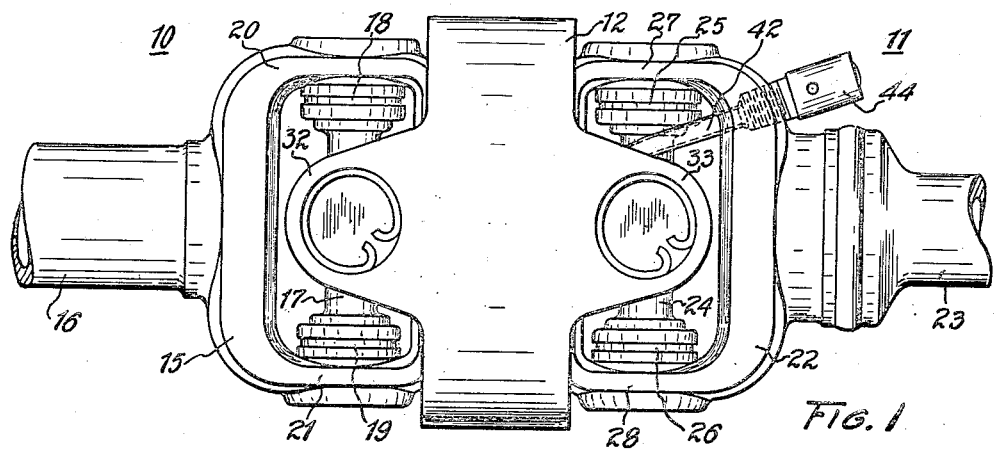
Fig. 1 is an outside elevational view showing a double universal joint constructed according to my invention.

Detailed reference will now be made to the accompanying drawing wherein I have illustrated an improved double universal joint which may be used for various purposes, but which is especially suitable for use in transmitting torque in motor vehicles of the front-wheel-drive type. In disclosing my invention I have illustrated what I now regard to be the preferred form of my improved universal joint, but it should be understood that the invention may be embodied in various other structural arrangements.

In general my improved double universal joint comprises a pair of universal joint assemblies 10 and 11 which are operably connected by an intermediate torque transmitting member 12, and a connection 13 between the joint assemblies for centering or relatively positioning corresponding members of the assemblies with respect to each other. As will appear more fully hereinafter, the positioning connection provided between corresponding members of the two joint assemblies, causes these members to always assume the same angular relationship with respect to an oscillation center whenever a flexing of the universal joint structure takes place.

As shown in the drawing the universal joint assembly 10 comprises a yoke 15, which may be formed integral with or connected to a torque transmitting shaft or spindle 16, and a cross 17 having oppositely extending trunnions 18 and 19 which are disposed in suitable bearings provided on the spaced arms 20 and 21 of the yoke. Likewise, the universal joint assembly 11 comprises a yoke 22, which may be formed integral with or connected to a torque transmitting shaft or spindle 23, and a cross 24 which is provided with oppositely extending trunnions 25 and 26. The trunnions of the cross 24 are disposed in suitable bearings which are provided on the spaced yoke arms 27 and 28 of the yoke 22.

The cross 17 of the joint assembly 10 is provided with a second pair of oppositely extending trunnions 29 which are disposed at substantially right angles to the axis of trunnions 18 and 19, and likewise, the cross 24 of the joint assembly 11 is provided with oppositely extending trunnions 30 which are disposed at substantially right angles to the axis of the trunnions 25 and 26. For connecting the two joint assemblies I provide the intermediate transmission member 12 which is in the form of a double yoke member common to the two joint assemblies 10 and 11.

This intermediate transmission member may be of any appropriate form and, in this instance, is of unitary one-piece construction in the form of a ring 31 having pairs of spaced yoke arms or ears 32 and 33 projecting from opposite sides thereof. The spaced ears 32 carry suitable bearings which are preferably similar to the bearings of the yoke arms 20 and 21 and in which the trunnions 29 of the cross 17 are disposed. The spaced ears 33 are likewise preferably provided with bearings similar to the bearings of the yoke arms 27 and 28 and in which the trunnions 30 of the cross 24 are disposed. From the arrangement which is illustrated in the drawing and which has just been described, it will be seen that the intermediate transmission member 12 is a double yoke member and is common to and connects the two joint assemblies 10 and 11. Moreover, from the arrangement disclosed, it will be understood by those skilled in the art, that the crosses 17 and 24 are trunnioned or swivelled in the yokes 15 and 22 and connect the same with the transmission member 31.

To provide the joint structure with a centering or positioning connection between the two joint assemblies, I construct the yoke 15 with a bridge or web 35, which integrally connects the yoke arms 20 and 21, and which carries a ball member or portion 36, and I likewise provide the yoke 22 with a web or bridge 37 integrally connecting the yoke arms 27 and 28 and carrying a socket member or portion 38 with which the ball portion 36 cooperates. Because of the arm connecting webs 35 and 37 the yokes 15 and 22 may be conveniently termed closed yokes. These webs materially strengthen the yokes and, in addition, serve to carry the cooperating parts of the positioning connection between the two joint assemblies.

Figure 2:
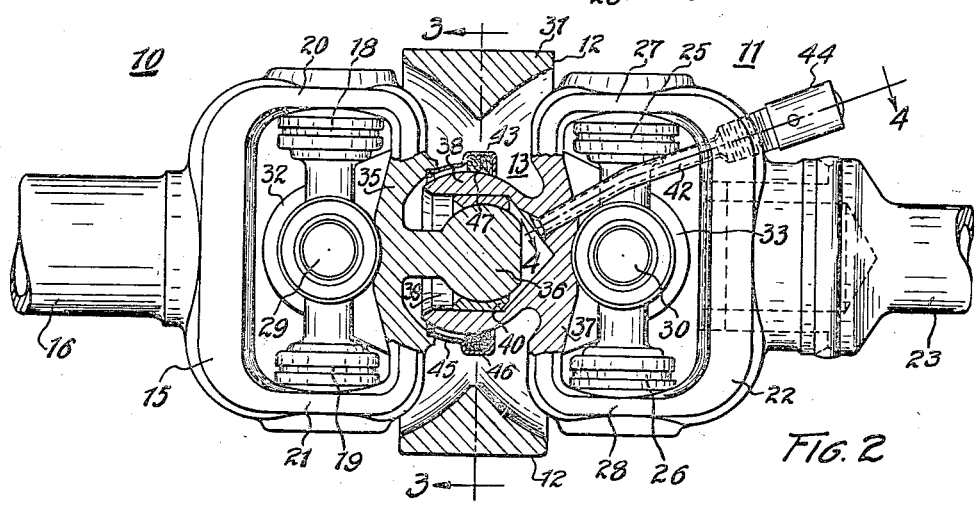
Fig. 2 is an elevational view showing the joint structure of Fig. 1, but with parts thereof in section.
Figures 3, 4:
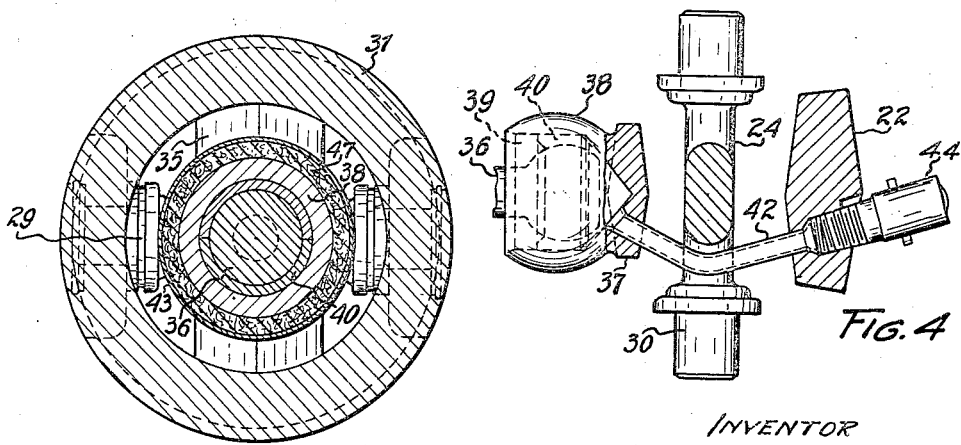
Fig. 3 is a transverse sectional view taken as indicated by line 3—3 of Fig. 2.
Fig. 4 is a fragmentary sectional view taken as indicated by line 4—4 of Fig. 2.

As shown in Fig. 2 of the drawing, the ball portion 36 extends into a recess or socket 39 of the portion 38 with a bearing or bushing 40 interposed between the spherical surface of the ball portion and the inner surface of the socket. To permit of the necessary axial movement of the ball portion 36 within the socket 39, during flexing of the universal joint structure, I mount the hollow bearing or bushing 40 for shifting or sliding movement within the socket. This socket is preferably, though not necessarily, of cylindrical cross section, as shown in Fig. 3, and the outer surface of the bearing 40 is of corresponding shape to slide in the socket. The inner surface of the bearing is spherical to cooperate with the spherical surface of the ball portion 36 and, to permit of assembly of these parts, the bearing is split or formed of complemental sections, as shown in Fig. 3. The bearing sections are assembled on the ball portion 36 before the latter is inserted into the socket 39.

As shown in Fig. 2 of the drawing the portion 38 of the yoke 22 is constructed with ample clearance spaces on opposite sides of the ball portion 36 and, to maintain the joint structure in an efficient operating condition, I provide a conduit 42 for supplying lubricant to these spaces and a sealing device 43 for retaining the lubricant and preventing the entry of foreign matter. The lubricant supply conduit may have any conveniently accessible location and, in this instance, is in the form of a tube, having opposite ends thereof mounted in the yoke 22 and with its intermediate portion extending past one of the trunnions of the cross 24. A lubricating connection, such as a fitting 44 of the check valve type, may be mounted in the yoke 22 at the outer end of the tube 42, so that lubricant may be readily supplied to the positioning connection through the tube.

The socket portion 38 of the positioning connection is provided with a rounded or substantially spherical outer surface, as shown in Fig. 2, and the sealing device 43 cooperates with this rounded outer surface. The sealing device itself is preferably in the form of a sheet metal shell 45 which is mounted on the bridge portion of the yoke 15 so as to form a socket into which the portion 38 extends. This sheet metal shell is provided at its outer end with an internal annular groove or channel 46 in which a suitable packing 47 is disposed for sealing engagement with the rounded surface of the portion 38. This packing is preferably so proportioned that it can be compressed sufficiently, at assembly of the device, to permit the rounded portion 38 to be inserted into the metal shell 45.

During use of my improved universal joint structure, torque is transmitted from one joint assembly to the other through the intermediate member 12 and whenever the angular position of one of the shaft members, such as the shaft member 16, is changed, the positioning connection 13 causes a corresponding change in the angular position of the other shaft member. Since the cooperating ball and socket portions 36 and 38 of the positioning connection are carried respectively by the yoke members 15 and 22, it will be seen that a tilting of either yoke member causes a corresponding tilting of the other yoke member. The shiftable sectional bearing 40 provides a simple and efficient operating connection between the cooperating ball and socket portions 36 and 38, and likewise the ball and socket arrangement formed by the shell 45.

From the foregoing description and the accompanying drawing it will now be readily seen that I have provided an improved form of double universal joint wherein novel means is embodied for centering or relatively positioning corresponding members of the two joint assemblies. It will be seen, moreover, that my improved universal joint structure is simple and compact and of economical construction, and that novel sealing means, embodied in this structure, conserves the lubricant supply and excludes foreign material so that the device is capable of rendering prolonged efficient service with the minimum of attention.

While I have illustrated and described the improved universal joint structure of my invention in a detailed manner, it should be understood, however, that I do not wish to be limited to the precise details of construction and arrangement of parts illustrated and described, but regard the invention as including such changes and modifications as do not involve a departure from the spirit of the invention and the scope of the appended claims.

Having thus described my invention, I claim:

1. In a universal joint the combination of a plurality of pairs of swivelly connected members, an intermediate transmission member having operative pivotal connection with corresponding members of said pairs, other corresponding members of said pairs having portions cooperating with each other for operatively connecting such other members, one of said cooperating portions having a recess therein and another having a ball disposed in said recess, and a bearing for said ball slidable in the recess.

2. In a universal joint the combination of a plurality of pairs of swivelly connected members, an intermediate transmission member having operative pivotal connection with corresponding members of said pairs, other corresponding members of said pairs having portions cooperating with each other for operatively connecting such other members, one of said cooperating portions having a recess therein and another having a ball disposed in said recess, and a sectional bearing carried by the ball and slidable in the recess.

3. In a universal joint the combination of a plurality of pairs of swivelly connected members, an intermediate transmission member having operative pivotal connection with corresponding members of said pairs, other corresponding members of said pairs having portions cooperating with each other for operatively connecting such other members, the cooperating portion of one of said other members being recessed and having a substantially spherical outer surface and the cooperating portion of a second of said other members being journaled in the recessed portion, and sealing means carried by said second member and engaging said spherical outer surface.

4. In a universal joint structure the combination of a pair of universal joint assemblies including an intermediate transmission member common to both of said assemblies, and positioning means for said assemblies comprising a hollow portion carried by one of said assemblies and a ball portion carried by the other of said assemblies and extending into said hollow portion, and a bearing for the ball portion slidable in said hollow portion.

5. In a universal joint structure the combination of a pair of universal joint assemblies including an intermediate transmission member common to both of said assemblies, and positioning means for said assemblies comprising a hollow portion carried by one of said assemblies and a ball portion carried by the other of said assemblies and extending into said hollow portion, and a sectional bearing assembled on said ball portion and slidable in said hollow portion.

6. In a universal joint structure the combination of a pair of universal joint assemblies including an intermediate transmission member common to both of said assemblies, positioning means for said assemblies comprising a hollow portion carried by one of said assemblies and a ball portion carried by the other of said assemblies and extending into the hollow portion, said hollow portion having a substantially spherical outer surface, and sealing means carried by said other of the assemblies and cooperating with said spherical outer surface.

7. In a universal joint structure the combination of a pair of universal joint assemblies including an intermediate transmission member common to both of said assemblies, positioning means for said assemblies comprising cooperating ball and socket portions carried by the respective assemblies, the socket portion of said positioning means having a rounded outer surface, a sheet metal shell carried by the assembly other than the one which carries the socket portion, and a packing in said shell engaging said rounded outer surface.

8. In a universal joint structure the combination of a pair of universal joint assemblies each comprising a yoke and a cross trunnioned therein, an intermediate yoke in which the cross of each of said assemblies is also trunnioned, and a positioning connection for said assemblies comprising a socketed extension on the yoke of one of the assemblies, a bearing slidable in said socketed extension, and a ball extension on the yoke of the other of said assemblies and seated in the slidable bearing.

9. In a universal joint structure the combination of a pair of universal joint assemblies each comprising a yoke and a cross trunnioned therein, an intermediate transmission ring having oppositely extending yoke portions in which the crosses of said assemblies are also trunnioned, and a positioning connection for said assemblies comprising a socketed portion formed integral with the yoke of one of said assemblies and extending into said ring, a bearing slidable in said socketed portion, and a ball portion formed integral with the yoke of the other of said assemblies and seated in said slidable bearing.

10. In a universal joint structure the combination of a pair of universal joint assemblies each comprising a yoke and a cross trunnioned therein, an intermediate transmission ring having oppositely extending yoke portions in which the crosses of said assemblies are also trunnioned, a positioning connection for said assemblies including a socketed portion carried by the yoke of one of said assemblies and a ball portion carried by the yoke of the other of said assemblies and operating in the socketed portion, the latter portion having a substantially spherical outer surface, means carried by the last mentioned yoke and providing a socket in which said socketed portion is operable, and a packing associated with said means and engaging said spherical outer surface.

11. In a universal joint the combination of a pair of universal joint assemblies including an intermediate transmission member common to both of said assemblies, a positioning connection for said assemblies comprising cooperating ball and socket portions carried by the respective assemblies and a bearing engaging the ball portion and slidable in the socket portion, means for introducing lubricant into said positioning connection, and means for sealing said connection against the escape of lubricant and the entry of foreign matter.

12. In a universal joint structure the combination of a pair of universal joint assemblies each comprising a yoke and a cross trunnioned therein, the yoke of each of said assemblies having closing means at its inner end, an intermediate yoke in which the cross of each of said assemblies is also trunnioned, and a positioning connection for said assemblies comprising a socketed part on the closing means of the yoke of one of the assemblies and a ball part on the closing means of the yoke of the other of said assemblies and having operative engagement in the socketed part.

13. In a universal joint structure the combination of a pair of universal joint assemblies each comprising a yoke and a cross trunnioned therein, the yoke of each of said assemblies having closing means at its inner end, an intermediate yoke in which the cross of each of said assemblies is also trunnioned, and a positioning connection for said assemblies comprising a socketed part on the closing means of the yoke of one of the assemblies, said socketed part having a rounded outer surface, a ball part on the closing means of the yoke of the other of said assemblies and having operative engagement in the socketed part, and a skirt part extending from the closing means of the last mentioned yoke and having sealing cooperation with the rounded outer surface of the socketed part.

JOHN W. B. PEARCE.